June 19, 1934.  E. E. EINFELDT  1,963,696
WHEEL STRUCTURE
Filed Aug. 27, 1931  2 Sheets-Sheet 1
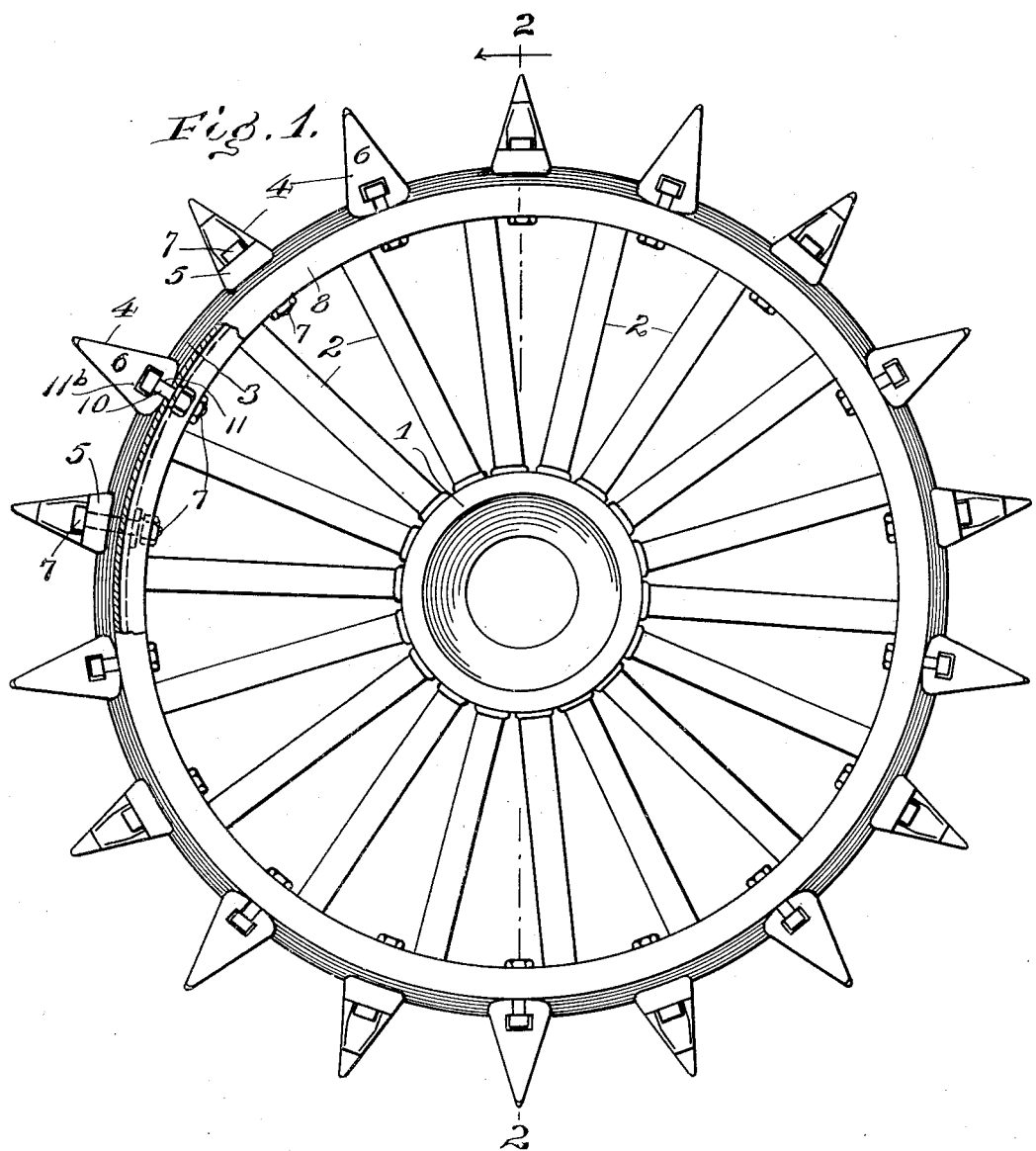
INVENTOR
E. E. Einfeldt
BY
ATTORNEY June 19, 1934.      E. E. EINFELDT      1,963,696
WHEEL STRUCTURE
Filed Aug. 27, 1931     2 Sheets-Sheet 2
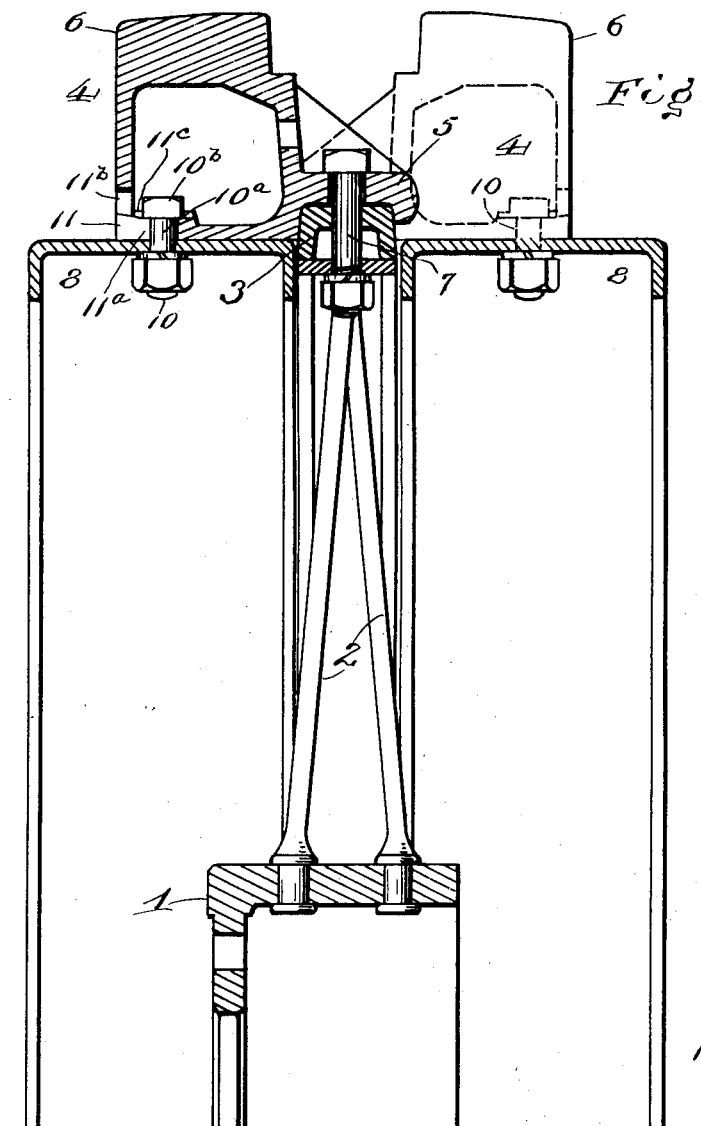
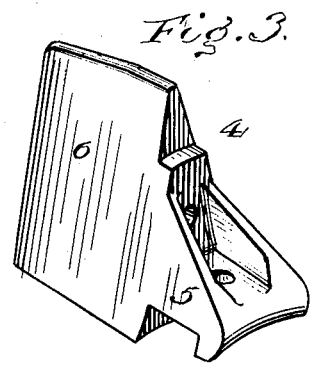
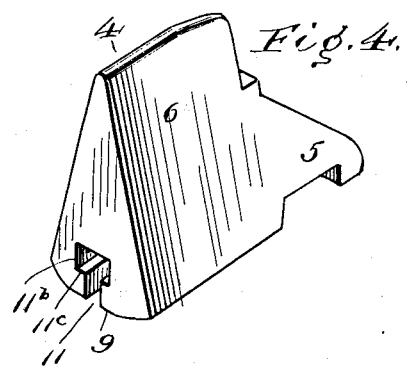
INVENTOR
E. E. Einfeldt
BY Morrison, Kennedy, Campbell
ATTORNEYS Patented June 19, 1934

1,963,696

UNITED STATES PATENT OFFICE 1,963,696

WHEEL STRUCTURE

Ernest E. Einfeldt, Davenport, Iowa, assignor to French & Hecht, Incorporated, a corporation of Iowa Application August 27, 1931, Serial No. 559,614

4 Claims. (Cl. 301—40)

The present invention has reference to wheel structures, and contemplates the provision of an extension rim or rims in connection with the main rim in order to improve the tractive effect. The invention is concerned more particularly with wheel structures in which the main rim is equipped with traction lugs, which while under certain conditions of use, will act satisfactorily, will under other conditions fail to act with the tractive effect desired; and it has been found in the operation of machines equipped with traction wheels, under conditions of practice, that by increasing the total width of the rim, by the application of an extension rim or rims, the desired results may be secured.

The present invention comprehends improved means for the attachment to a tractive wheel of an extension rim or rims, in which the traction lugs themselves serve as the medium of attachment of the extension rims; and in the specification to follow, the invention will be described in detail, and the novel features thereof will be set forth in the appended claims.

In the accompanying drawings:

Fig. 1 is a side elevation of a traction wheel having my invention embodied therein;

Fig. 2 is a sectional elevation of the same, on an enlarged scale on the line 2—2 of Fig. 1;

Fig. 3 is a perspective view of one of the traction lugs, looking from the inner end of the same;

Fig. 4 is a similar view of the same, looking from the outer end.

Referring to the drawings.

The wheel shown as illustrative of the invention comprises a hub 1, spokes 2, main rim 3 and traction lugs 4 applied at intervals to the tread portion of the rim and each comprising an inner attaching portion or foot 5 and an outer body portion 6 extending laterally from the attaching portion. These lugs are applied in staggered relations to the rim, with the body portions of alternate lugs projecting respectively in opposite directions from the sides of the rim, as best shown in Fig. 2, and the lugs are firmly fastened to the rim 3 by means of bolts 7 passing through holes in the foot portions of the lugs and in the rim and held by nuts screwed on the bolts and bearing against washers bearing in turn against the inner side of the rim 3.

In the wheel shown, the main rim is of channel form, with the channel facing radially inward, and the foot portion of each lug is formed in its radially inner side with a socket, as best shown in Figs. 3 and 4, which socket fits over the peripheral or tread portion of the main rim, as shown in Fig. 1, and serves effectually to prevent the lug from twisting from side strains encountered in practice.

In accordance with the present invention, the traction lugs are specially formed and constructed to serve as the medium of attachment to the wheel, of extension rims 8, one on either side of the main rim, in order to improve the tractive effect of the wheel, and in carrying out this object, the radially inner sides of the laterally projecting body portions 6 of the traction lugs are formed each with a central flat surface 9, which surfaces of the cleats projecting at one side of the main rim, conjointly form a seat for the extension rim 8 at that side, while the similar surfaces 9 on the cleats projecting from the other side of the main rim, conjointly form a seat for the expansion rim 8 on that side. The extension rims 8 are, in the present instance, in the form of plain cylindrical bands, having inwardly extending stiffening edge flanges, and these rims are held to their seats on the traction lugs by fastening bolts 10, engaging the lugs and bands respectively, and being readily releasable so that the extension rims may be readily applied or removed at will, according to the conditions encountered in practice.

To enable the fastening bolts to be engaged with the traction lugs with ease and facility in applying the extension rims, each lug has formed in its axially outer end and through the flat seating surface 9 therethrough, an outwardly opening slot 11 and comprising a radial portion 11$^a$ to receive the shank or stem 10$^a$ of the bolt, and a lateral portion 11$^b$ communicating with the radial portion, to receive the head 10$^b$ of the bolt, the said slot being provided at the junction of the radial and horizontal portions with lateral shoulders 11$^c$ against which the head of the bolt bears, so that with the several bolts thus engaged with the traction lugs and extending radially inwardly through bolt holes in the extension rim, by screwing up the nuts against the radially inner side of the rim, the latter will be clamped firmly but releasably in place on its seat on the lugs.

In proceeding to apply an extension rim to a traction wheel, the extension rim furnished with bolt holes at positions therearound corresponding to the location of the traction lugs on the main rim, has the fastening bolts passed through the several holes, with the heads on the outside and nuts on the inside, and with the nuts at such distance from the heads as to permit the heads, in the seating of the rim in place against the seats on the lugs, to pass into the horizontal portions of the slots 9 and seat upon the shoulders 11° of said slots, whereupon the nuts are screwed up, and binding against the inner side of the rim, the latter will be held firmly on its seat on the lugs.

In removing the extension rim, it is merely necessary to unscrew the nuts slightly to release the parts, whereupon the rim may be drawn axially away from the wheel, the several bolts in this action sliding outwardly through the outwardly opening slots in the traction lugs. It is seen therefore that the application of the extension rims and their removal may be effected with ease and without loss of time.

While in the foregoing description and accompanying drawings, the invention has been set forth as embodied in a certain detailed form of the parts, it will be understood that these details may be variously changed and modified by the skilled mechanic without departing from the spirit of the invention; and it will be understood further that the invention is not limited to any particular form or construction of the parts, except as such limitations are specified in the claims.

Having thus described my invention, what I claim is:

1. In a wheel structure, the combination of a main rim, traction lugs applied thereto at intervals therearound and projecting laterally therefrom, bolts engaging the lugs and main rim and acting to secure the traction lugs thereto, said lugs being provided on the radially inner sides of their lateral portions with seats for an extension rim, and said lugs being formed each in the radially inner side of its lateral projecting portion with an axially extending slot opening through both its axially outer end and its radially inner side to receive a fastening bolt, an extension rim applied to said seats, and fastening bolts seated in the said slots and engaging the extension rim to hold the latter detachably on its seats.

2. In a wheel structure, the combination of a main rim, traction lugs applied thereto at intervals therearound and formed each with a lateral portion overhanging the side of the main rim, having on their radially inner sides seats for an extension rim, said lateral portions of the lugs being formed each in its laterally projecting portion with an axially extending slot opening through both its axial outer end and its radial inner side, said slot having a radial portion and a communicating horizontal portion, and shoulders at the junction of said portions, an extension rim applied to said seats, and fastening bolts having their shanks extending in the radial portions of the slots and through holes in the extension rim, heads on the bolts seated on said shoulders, and nuts on the bolts bearing against the inner side of the extension rim.

3. A traction lug for a wheel structure, said lug having an axially inner attaching portion for connection with the main rim of the structure and having a portion extending both laterally and radially therefrom with the radially inner side of the lateral portion formed to serve as a seat for an extension rim, said lateral portion of the lug being formed adjacent the rim seat with an axially extending slot opening through both its axially outer and radially inner sides to receive a bolt for fastening the extension rim in place.

4. A traction lug for a wheel structure, said lug having an axially inner attaching foot formed in its axially inner side with a socket to fit around and interlock with the peripheral portion of the main rim, and having a lug portion extending both axially and radially from said foot with the radially inner side of said lateral portion formed to serve as a seat for an extension rim, said lateral portion of the lug being formed with a slot extending radially through said rim-seat, and axially through its axially outer side to receive a bolt for fastening a supplemental rim to the lug.

ERNEST E. EINFELDT.